United States Patent
Konashi

(10) Patent No.: US 11,983,064 B2
(45) Date of Patent: May 14, 2024

(54) ABNORMALITY DETECTION APPARATUS, CONTROL METHOD, AND PROGRAM

(71) Applicant: NEC Corporation, Tokyo (JP)

(72) Inventor: Takashi Konashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 17/632,317

(22) PCT Filed: Aug. 9, 2019

(86) PCT No.: PCT/JP2019/031592
§ 371 (c)(1),
(2) Date: Feb. 2, 2022

(87) PCT Pub. No.: WO2021/028963
PCT Pub. Date: Feb. 18, 2021

(65) Prior Publication Data
US 2022/0334908 A1   Oct. 20, 2022

(51) Int. Cl.
*G06F 11/00* (2006.01)
*G06F 11/07* (2006.01)

(52) U.S. Cl.
CPC ...... *G06F 11/0751* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 2001/0011358 A1 | 8/2001 | Ochiai | |
| 2006/0005063 A1* | 1/2006 | Patrick | G06F 11/0772 |
| | | | 714/1 |
| 2009/0327490 A1 | 12/2009 | Saka | |
| 2016/0321078 A1* | 11/2016 | Bailey | G06F 9/3802 |
| 2018/0210808 A1* | 7/2018 | Shanmugam | G06F 11/366 |
| 2018/0227451 A1 | 8/2018 | Sakamoto | |
| 2021/0124672 A1* | 4/2021 | Abdelhalim | G06F 11/327 |

FOREIGN PATENT DOCUMENTS

| | | |
|---|---|---|
| JP | 2000-010619 A | 1/2000 |
| JP | 2001-209561 A | 8/2001 |
| JP | 2004-295548 A | 10/2004 |
| JP | 2006-318036 A | 11/2006 |
| JP | 2007-052550 A | 3/2007 |
| JP | 2007-172221 A | 7/2007 |
| JP | 2008-117007 A | 5/2008 |

(Continued)

OTHER PUBLICATIONS

Google Scholar/Patents search—text refined (Year: 2023).*

(Continued)

*Primary Examiner* — Christopher S McCarthy

(57) ABSTRACT

An abnormality detection apparatus (2000) detects a start of a predetermined operation in a terminal (10). The abnormality detection apparatus (2000) acquires reference information (30) representing a reference of abnormality detection of the terminal (10) after the predetermined operation is started. After it is detected that the predetermined operation is started, the abnormality detection apparatus (2000) detects abnormality of the terminal (10) by using the acquired reference information (30).

15 Claims, 13 Drawing Sheets

(56) References Cited

FOREIGN PATENT DOCUMENTS

| | | |
|---|---|---|
| JP | 2012-194951 A | 10/2012 |
| JP | 2018-049562 A | 3/2018 |
| JP | 2018-129714 A | 8/2018 |
| WO | 2008/114378 A1 | 9/2008 |

OTHER PUBLICATIONS

Google Scholar/Patents search—text refined (Year: 2024).*
International Search Report for PCT Application No. PCT/JP2019/031592, dated Oct. 21, 2019.
JP Office Action for JP Application No. 2021-539699, dated May 16, 2023 with English Translation.

* cited by examiner

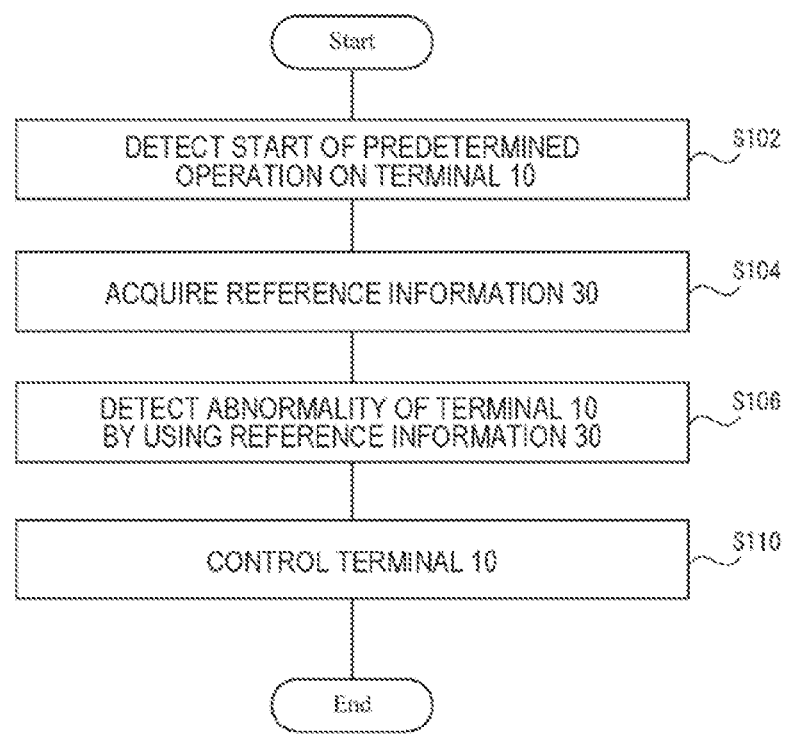

ABNORMALITY DETECTION APPARATUS, CONTROL METHOD, AND PROGRAM

This application is a National Stage Entry of PCT/JP2019/031592 filed on Aug. 9, 2019, the contents of all of which are incorporated herein by reference, in their entirety.

TECHNICAL FIELD

The present invention relates to abnormality detection.

BACKGROUND ART

A technique for detecting abnormality of a computer system has been developed. For example, Patent Document 1 discloses a system in which abnormality of observation target software is detected by using a normal operation model.

RELATED DOCUMENT

Patent Document

[Patent Document 1] Japanese Patent Application Publication No. 2018-129714

SUMMARY OF THE INVENTION

Technical Problem

The inventor of the present application found that an appropriate reference for determining whether a computer system is abnormal depends on a circumstance of the system and the like. In this regard, in a reference of Patent Document 1, one rule is fixedly used as a reference of abnormality detection.

The present invention has been made in view of the above-described problem, and one of objects of the present invention is to provide a technique for detecting abnormality of a computer system with high accuracy.

Solution to Problem

An abnormality detection apparatus according to the present invention includes 1) a first detection unit that detects a start of a predetermined operation in a terminal; 2) an acquisition unit that acquires reference information representing a reference of abnormality detection of the terminal after the predetermined operation is started; and 3) a second detection unit that detects, after it is detected that the predetermined operation is started, abnormality of the terminal by using the acquired reference information.

A control method according to the present invention is performed by a computer. The control method includes 1) a first detection step of detecting a start of a predetermined operation in a terminal; 2) an acquisition step of acquiring reference information representing a reference of abnormality detection of the terminal after the predetermined operation is started; and 3) a second detection step of detecting, after it is detected that the predetermined operation is started, abnormality of the terminal by using the acquired reference information.

A program according to the present invention causes a computer to execute each step of the control method according to the present invention.

Advantageous Effects of Invention

The present invention provides a technique for detecting abnormality of a computer system with high accuracy.

BRIEF DESCRIPTION OF THE DRAWINGS

The above-described object, other objects, features, and advantages will become more apparent from suitable example embodiments described below and the following accompanying drawings.

FIG. 13 is a flowchart illustrating a flow of processing to be performed by the abnormality detection apparatus according to the example embodiment 3.

DESCRIPTION OF EMBODIMENTS

Hereinafter, example embodiments according to the present invention are described with reference to the drawings. Note that, in all of the drawings, a similar constituent element is designated by a similar reference sign, and description thereof is omitted as necessary. Further, in each block diagram, each block represents a configuration of a functional unit instead of a configuration of a hardware unit unless otherwise specifically described.

Example Embodiment 1

<Overview>

Figure 1:
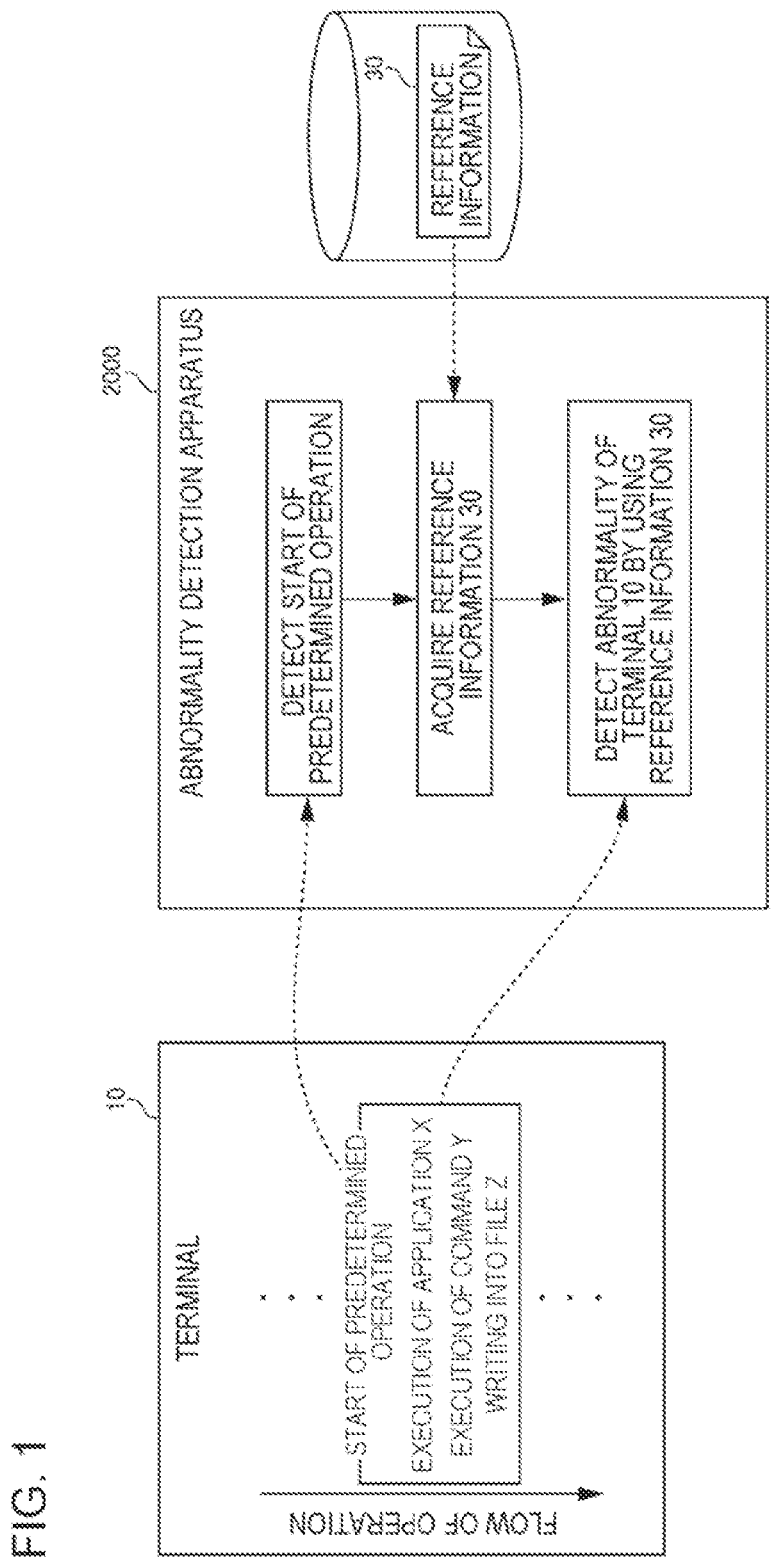
FIG. 1 is a diagram illustrating an overview of an operation of an abnormality detection apparatus according to a present example embodiment.

FIG. 1 is a diagram illustrating an overview of an operation of an abnormality detection apparatus 2000 according to a present example embodiment. FIG. 1 is a diagram illustrating conceptual explanation for facilitating understanding on an operation of the abnormality detection apparatus 2000, and does not specifically limit an operation of the abnormality detection apparatus 2000.

The abnormality detection apparatus 2000 detects abnormality of a terminal 10. Herein, the terminal 10 may be a physical machine, or may be a virtual machine. Note that, "abnormality" herein represents various states not being normal. For example, abnormality is abnormality in terms of security such that there is a possibility that malware is present. However, abnormality of the terminal 10 is not limited to abnormality in terms of security.

More specifically, first, the abnormality detection apparatus 2000 detects a start of a predetermined operation in the terminal 10. Herein, the predetermined operation represents a series of operations being one or more operations to be performed by the terminal 10. For example, the "predetermined operation" is a series of maintenance processing (such as execution of a series of commands) to be performed in the terminal 10. Further, the abnormality detection apparatus 2000 acquires reference information 30. The reference information 30 represents a reference for detecting abnormality of the terminal 10 after the above-described predetermined operation is started.

After a predetermined operation is detected in the terminal 10, the abnormality detection apparatus 2000 detects abnormality of the terminal 10 by using the acquired reference information 30. For example, the abnormality detection apparatus 2000 determines, by using the reference information 30, whether an operation of an application in the terminal 10 is abnormal. Then, when an abnormal operation of the application is detected in the terminal 10, the abnormality detection apparatus 2000 determines that the terminal 10 is abnormal.

One Example of Advantageous Effect

As a method of detecting abnormality of the terminal 10, a method is proposed in which it is detected that the terminal 10 performs a behavior different from a normal behavior. For example, the method is detecting abnormality of the terminal 10 by monitoring an event (e.g., execution of a system call) occurring in the terminal 10, and detecting occurrence of an abnormal event (detecting an abnormal operation).

However, there is a case where a normal behavior of the terminal 10 is different from that of an ordinary time in a circumstance different from the ordinary time, such as performing maintenance of the terminal 10. Specifically, there is a case where, even an operation that should be determined to be abnormal in an ordinary time, should be determined to be a normal operation in a specific circumstance such as a maintenance time. Therefore, a reference to be used in abnormality detection of the terminal 10 may change depending on a circumstance of the terminal 10.

In view of the above, the abnormality detection apparatus 2000 detects a start of a predetermined operation in the terminal 10, and after the predetermined operation is started, detects abnormality of the terminal 10 by using the reference information 30 indicating a reference of abnormality detection after the predetermined operation is started. This enables detecting abnormality of the terminal 10 at an appropriate reference depending on a circumstance in which a predetermined operation such as maintenance is performed, when the predetermined operation is performed. Thus, the abnormality detection apparatus 2000 can detect abnormality of the terminal 10 with accuracy.

Hereinafter, the abnormality detection apparatus 2000 according to the present example embodiment is described in further detail.

Example of Functional Configuration of Abnormality Detection Apparatus 2000

Figure 2:
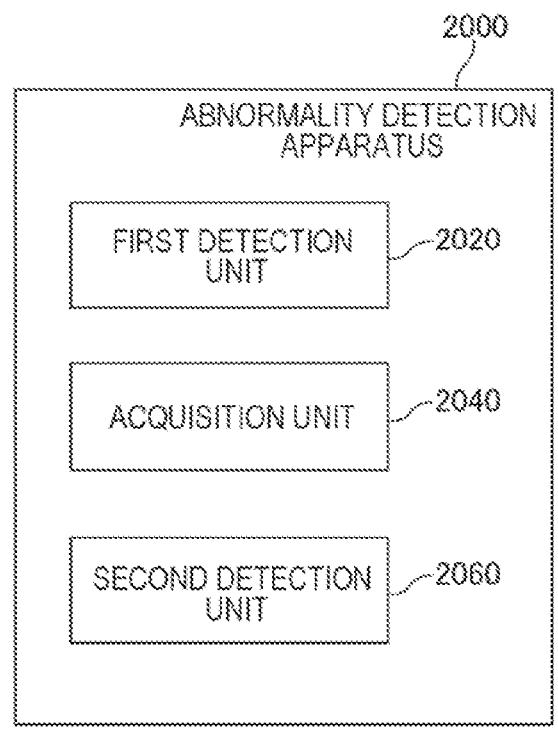
FIG. 2 is a diagram illustrating a configuration of an abnormality detection apparatus according to an example embodiment 1.

FIG. 2 is a diagram illustrating a configuration of the abnormality detection apparatus 2000 according to the example embodiment 1. The abnormality detection apparatus 2000 includes a first detection unit 2020, an acquisition unit 2040, and a second detection unit 2060. The first detection unit 2020 detects a start of a predetermined operation in the terminal 10. The acquisition unit 2040 acquires the reference information 30. After a start of a predetermined operation is detected, the second detection unit 2060 detects abnormality of the terminal 10 by using the reference information 30.

<Hardware Configuration of Abnormality Detection Apparatus 2000>

Each functional configuration unit of the abnormality detection apparatus 2000 may be achieved by hardware (example: a hard-wired electronic circuit, and the like) for achieving each functional configuration unit, or may be achieved by combination of hardware and software (example: combination of an electronic circuit and a program for controlling the electronic circuit, and the like). Hereinafter, a case where each functional configuration unit of the abnormality detection apparatus 2000 is achieved by combination of hardware and software is further described.

Figure 3:
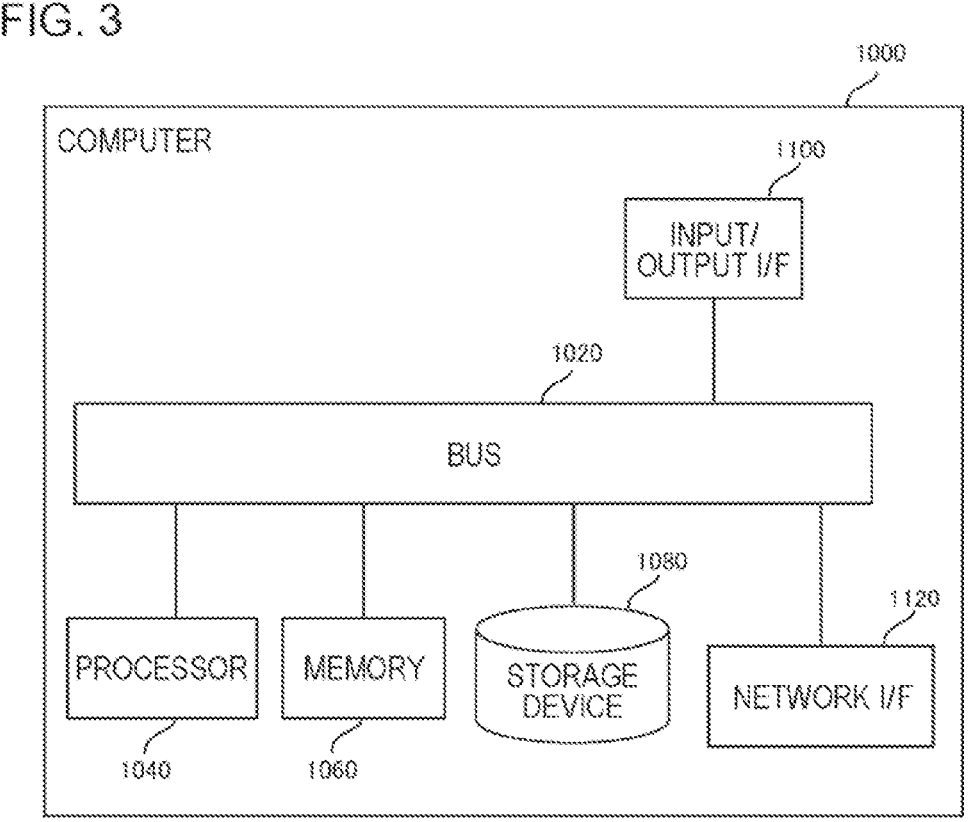
FIG. 3 is a diagram illustrating a computer for achieving the abnormality detection apparatus.

For example, the abnormality detection apparatus 2000 is achieved by one computer. FIG. 3 is a diagram illustrating a computer 1000 for achieving the abnormality detection apparatus 2000. The computer 1000 is any computer. For example, the computer 1000 is a personal computer (PC), a server machine, a tablet terminal, a smartphone, or the like. The computer 1000 may be a dedicated computer designed for achieving the abnormality detection apparatus 2000, or may be a general-purpose computer.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection. The processor 1040 is a processor such as a central processing unit (CPU), a graphics processing unit (GPU), or a field-programmable gate array (FPGA). The memory 1060 is a main storage achieved by using a random access memory (RAM) or the like. The storage device 1080 is an auxiliary storage to be achieved by using a hard disk drive, a solid state drive (SSD), a memory card, a read only memory (ROM), or the like. However, the storage device 1080 may be constituted of hardware similar to hardware constituting a main storage.

The input/output interface 1100 is an interface for connecting the computer 1000 to an input/output device. The network interface 1120 is an interface for connecting the computer 1000 to a communication network. The communication network is, for example, a local area network (LAN) or a wide area network (WAN). A method of connecting to a communication network by the network interface 1120 may be wireless connection or may be wired connection.

The storage device 1080 stores a program module for achieving a functional configuration unit of the abnormality detection apparatus 2000. The processor 1040 achieves a function associated with each program module by reading each program module in the memory 1060 and executing each problem module.

The abnormality detection apparatus 2000 may be achieved by two or more computers. Each computer in this case also has, for example, a hardware configuration illustrated in FIG. 3.

<Flow of Processing>

Figure 4:
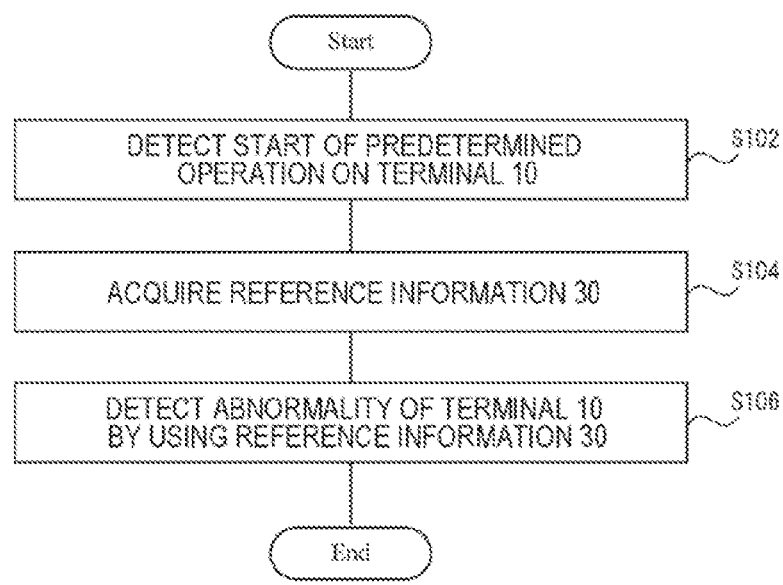
FIG. 4 is a flowchart illustrating a flow of processing to be performed by the abnormality detection apparatus according to the example embodiment 1.

FIG. 4 is a flowchart illustrating a flow of processing to be performed by the abnormality detection apparatus 2000 according to the example embodiment 1. The first detection unit 2020 detects a start of a predetermined operation in the terminal 10 (S102). The acquisition unit 2040 acquires the reference information 30 (S104). The detection unit 2060 detects abnormality of the terminal 10 by using the reference information 30 (S106).

Specific Example of Usage Environment of Abnormality Detection Apparatus 2000

The abnormality detection apparatus 2000 can be achieved in various usage environments. Herein, some of specific examples of the usage environments are exemplified.

Example 1 of Usage Environment

Figure 5:
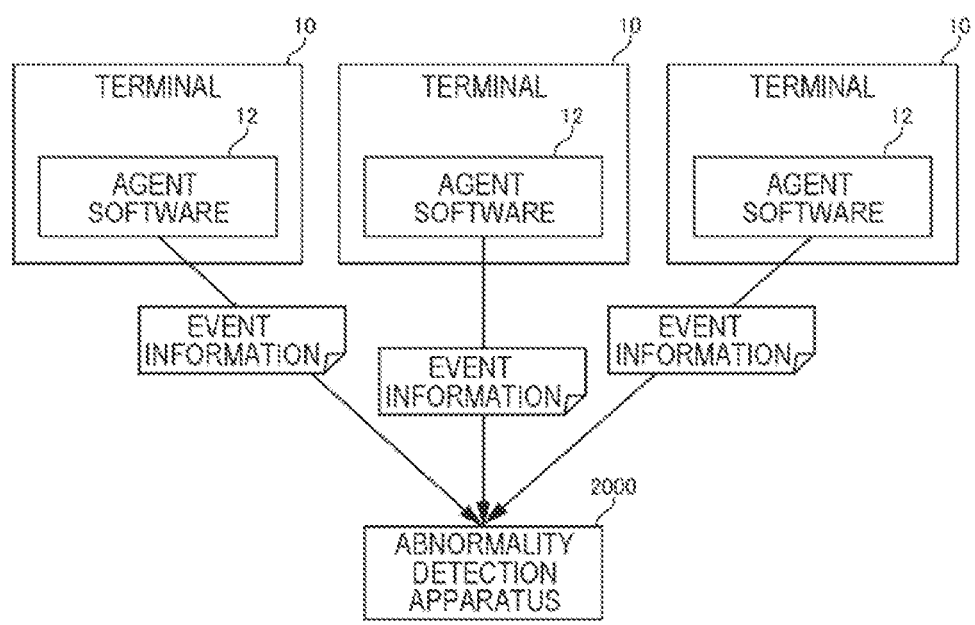
FIG. 5 is a first diagram illustrating a usage environment of the abnormality detection apparatus.

FIG. 5 is a first diagram illustrating a usage environment of the abnormality detection apparatus 2000. In this example, the abnormality detection apparatus 2000 is achieved as an apparatus separately from the terminal 10. Further, agent software 12 is operated in the terminal 10. The agent software 12 detects that a predetermined operation is started in the terminal 10, and notifies the abnormality detection apparatus 2000 of the detection.

Further, the agent software 12 provides the abnormality detection apparatus 2000 with information representing a behavior of the terminal 10. For example, the agent software 12 provides the abnormality detection apparatus 2000 with information (hereinafter, event information) representing each event occurring in the terminal 10. For example, the event information indicates a subject, an object, a content, and a time of occurrence of an event occurring in the terminal 10. A subject of an event is, for example, a process that has generated the event. An object of an event is, for example, another process operated by a process being a subject, data such as a file, a socket, or the like. A content of an event is, for example, a start or an end of a process, reading and writing of data with respect to a file, reading and writing of data with respect to a network (with respect to a socket and the like), or the like. Note that, it is possible to use an existing technique, as a technique for detecting occurrence of various events such as execution of a system call, and a technique for generating information representing a content of the event.

Example 2 of Usage Environment

Figure 6:
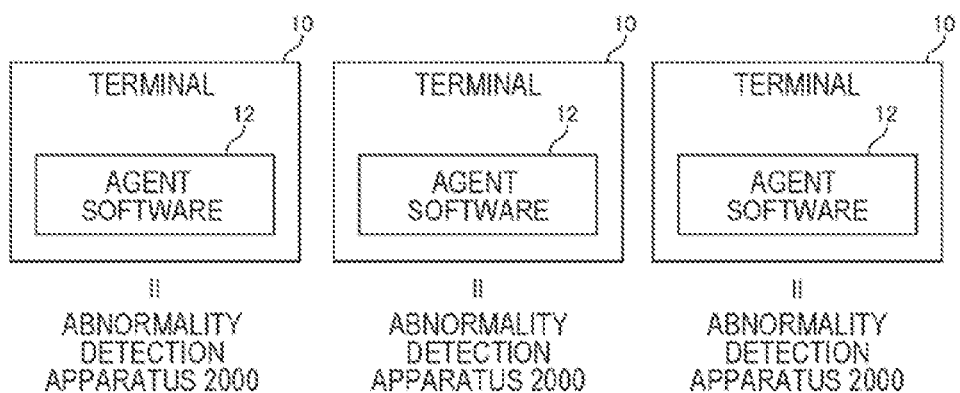
FIG. 6 is a second diagram illustrating a usage environment of the abnormality detection apparatus.

FIG. 6 is a second diagram illustrating a usage environment of the abnormality detection apparatus 2000. In this example, the abnormality detection apparatus 2000 is achieved by the terminal 10. Specifically, the terminal 10 has a function of operating as the abnormality detection apparatus 2000. Therefore, abnormality detection of the terminal 10 is performed by the terminal 10 itself. Also in this case, the agent software 12 is operated in the terminal 10 to achieve detection of the above-described event.

For example, the agent software 12 is allowed to have a function of the abnormality detection apparatus 2000. Specifically, causing the agent software 12 to have a function of detecting an event, a function of detecting a start of a predetermined operation, based on a detected event, a function of acquiring the reference information 30, and a function of detecting abnormality of the terminal 10, based on a detected event and the reference information 30 enables achieving the abnormality detection apparatus 2000. However, a function of the abnormality detection apparatus 2000 may be implemented in software different from the agent software 12.

<Detection of Start of Predetermined Operation: S102>

The first detection unit 2020 detects that a predetermined operation is started in the terminal 10. Herein, in order to detect a start of a predetermined operation, for example, a behavior of the terminal 10 at a timing when the predetermine operation is started is defined in advance. Hereinafter, information for defining a behavior of the terminal 10 at a time of a start of a predetermined operation is referred to as trigger information. The trigger information is, for example, stored in advance in a storage apparatus accessible from the abnormality detection apparatus 2000.

For example, it is assumed that a predetermined operation is started by execution of a predetermined file (such as a script file or an execution file of an application). In this case, the trigger information indicates a type (content) of a behavior being "execution of a file", identification information (such as a path of a file) of a predetermined file being an object of the behavior, and the like. In addition to the above, for example, it is assumed that a predetermined operation is started by execution of a predetermined command. In this case, the trigger information indicates a type of a behavior being "execution of a command", and identification information (such as a command name) of a predetermined command being an object of the behavior.

Herein, the trigger information may further indicate a subject of the behavior, in addition to a content and an object of the behavior. In this case, a start of a predetermined operation is detected only when a specific behavior is performed by a specific subject.

Execution of a predetermined file or a predetermined command can be detected by, for example, using the above-described event information. In view of the above, for example, the first detection unit 2020 repeatedly acquires the event information from the agent software 12, and determines whether trigger information that matches with an event indicated by the acquired event information is present. Then, in a case where it is determined that trigger information that matches with an event indicated by event information is present, the first detection unit 2020 determines that a predetermined operation is started.

Herein, comparison between event information and trigger information may be performed by the agent software 12. Specifically, the agent software 12 determines whether a predetermined operation is started in the terminal 10 by comparing event information with trigger information. In a case where it is determined that trigger information that matches with an event indicated by event information is present, the agent software 12 notifies the first detection unit 2020 of a start of a predetermined operation. The first detection unit 2020 detects a start of a predetermined operation by receiving the notification. Note that, in this case, trigger information is stored in a storage apparatus accessible from the agent software 12.

An operation to be handled as a predetermined operation may be an operation of one type, or may be operations of a plurality of types. In a case where operations of a plurality of types are handled as a predetermined operation, trigger information relating to each of predetermined operations is prepared for each of the predetermined operations. Note that, in a case where operations of a plurality of types are handled as a predetermined operation, an operation to be performed by the abnormality detection apparatus 2000 may be the same regardless of a type of a predetermined operation performed in the terminal 10, or an operation to be performed by the abnormality detection apparatus 2000 may be differentiated depending on a type of a predetermined operation performed in the terminal 10.

In a case where only an operation of one type is handled as a predetermined operation, it is sufficient that the first detection unit 2020 can recognize a fact that a predetermined operation is started. This is also similar to a case even where operations of a plurality of types are handled as a predetermined operation, as far as an operation to be performed by the abnormality detection apparatus 2000 is the same regardless of a type of a predetermined operation started in the terminal 10. In view of the above, in a case where the agent software 12 performs comparison between event information and trigger information in these cases, the agent software 12 transmits, to the first detection unit 2020, any piece of information of a format determined in advance, as information representing a start of a predetermined operation in the terminal 10.

On the other hand, it is assumed that operations of a plurality of types are handled as a predetermined operation, and an operation of the abnormality detection apparatus 2000 is differentiated depending on a type of a predetermined operation started in the terminal 10. In this case, the first detection unit 2020 needs to recognize not only a fact that a predetermined operation is started in the terminal 10, but also which one of the predetermined operations is started. In view of the above, in this case, the agent software 12 transmits, to the first detection unit 2020, information of a predetermined format including identification information of a predetermined operation started in the terminal 10. Herein, as a premise, pieces of identification information capable of identifying one another are allocated to a plurality of predetermined operations, respectively. Then, trigger information is stored in a storage apparatus in association with identification information of a predetermined operation associated with the trigger information.

Note that, in a case where abnormality detection using the reference information 30 is ended in a case where a predetermined operation is ended, the abnormality detection apparatus 2000 also detects an end of the predetermined operation by a method similar to a method of detecting a start of the predetermined operation.

<Regarding Reference Information 30>

The reference information 30 indicates a reference of abnormality detection to be used when a predetermined operation is performed. For example, the reference information 30 indicates permission and inhibition regarding an operation of the terminal 10, such as execution of an application, execution of a command, execution of a system call, loading of a library, reading and writing with respect to a registry, or reading and writing with respect to a file and a network.

The reference information 30 may indicate permission and inhibition of the above-described various operations by an operation (order) having an order. For example, it is assumed that the reference information 30 indicates a series of operation sequences (also referred to as a normal model) to be permitted by the terminal 10 in an order of "execution of an application X, execution of a command Y, and writing into a file Z". In this case, these operations indicated by the reference information 30 are permitted only in a case where these operations are performed in this order. Therefore, in the above-described example, writing into the file Z before the command Y is executed is inhibited. In this way, in a case where an order of a command and an application to be executed within a predetermined operation is known in advance, abnormality of the terminal 10 can be detected with enhanced accuracy by defining the order by the reference information 30.

Herein, a reference of abnormality detection may be differentiated for each predetermined operation. In this case, the reference information 30 is prepared for each predetermined operation. Herein, the reference information 30 indicating a series of operations to be permitted during a period when a predetermined operation is performed can also be expressed, in association with the predetermined operation, as information representing a scenario of the predetermined operation (information indicating which operation is performed in which order within the predetermined operation).

Figure 7:
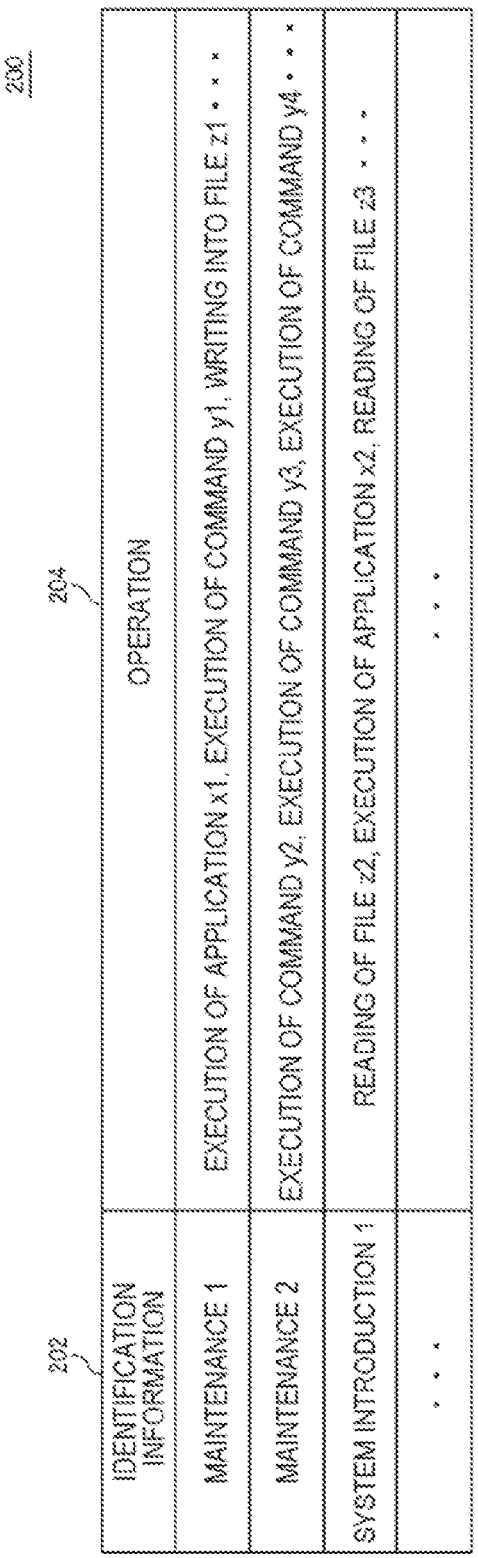
FIG. 7 is a diagram illustrating first reference information in a table format.

FIG. 7 is a diagram illustrating the reference information 30 in a table format. A table in FIG. 7 indicates identification information 202 and an operation 204. The identification information 202 is identification information of a predetermined operation, and indicates a name assigned to a predetermined operation in the present example. The operation 204 indicates one operation or a series of operations to be permitted.

The reference information 30 is generated in advance, and is stored in a storage apparatus accessible from the abnormality detection apparatus 2000. Herein, a method of generating the reference information 30 is optional. For example, the reference information 30 may be generated manually by an administrator or the like. In addition to the above, for example, the reference information 30 may be automatically generated in such a way that a predetermined operation performed in a test environment is recorded, and one or more operations performed within the predetermined operation are indicated. The automatic generation may be performed by the abnormality detection apparatus 2000 or may be performed by an apparatus other than the abnormality detection apparatus 2000. Herein, it is appropriate to use a sandbox environment, as the above-described test environment.

<Acquisition of Reference Information 30: S104>

The acquisition unit 2040 acquires the reference information 30 (S104). The acquisition unit 2040 acquires the reference information 30 from a storage apparatus in which the above-described reference information 30 is stored.

Note that, in a case where only an operation of one type is handled as a predetermined operation, or in a case where common reference information 30 is used regardless of a type of a predetermined operation, the acquisition unit 2040 may acquire the reference information 30 before a start of a predetermined operation is detected. On the other hand, in a case where the reference information 30 is prepared for each predetermined operation, the acquisition unit 2040 acquires the reference information 30 associated with a predetermined operation whose start is detected by the first detection unit 2020.

Herein, in a case where the reference information 30 indicates a series of operations, the acquisition unit 2040 may acquire a content of the reference information 30 piece by piece, instead of acquiring all the pieces of content of the reference information 30 all at once. For example, the acquisition unit 2040 acquires operations to be permitted one by one in an order from a leading position. Specifically, at first, the acquisition unit 2040 acquires, from the reference information 30, an operation to be permitted first. Then, the operation is performed in the terminal 10, and the acquisition unit 2040 acquires, from the reference information 30, an operation to be permitted next in response to detection by the second detection unit 2060 that the operation is a normal operation.

<Abnormality Detection of Terminal 10: S106>

The second detection unit 2060 detects abnormality of the terminal 10 by using the reference information 30 (S106). Abnormality detection of the terminal 10 is, for example, performed by comparison between the above-described event information and the reference information 30. For example, it is assumed that the reference information 30 individually indicates a normal event. In this case, the second detection unit 2060 determines whether an event indicated by the event information is included in the reference information 30. In a case where the event is not included in the reference information 30, the second detection unit 2060 determines that the terminal 10 is abnormal (detects abnormality of the terminal 10). On the other hand, in a case where the event is included in the reference information 30, the second detection unit 2060 determines that the terminal 10 is normal.

In addition to the above, for example, it is assumed that the reference information 30 individually indicates an abnormal event. In this case, the second detection unit 2060 determines whether an event indicated by the event information is included in the reference information 30. In a case where the event is not included in the reference information 30, the second detection unit 2060 determines that the terminal 10 is normal. On the other hand, in a case where the event is included in the reference information 30, the second detection unit 2060 determines that the terminal 10 is abnormal (detects abnormality of the terminal 10).

In addition to the above, for example, it is assumed that the reference information 30 indicates a normal model being a model representing a normal event sequence. In this case, the second detection unit 2060 determines whether an event sequence represented by a plurality of events acquired from the agent software 12 matches with a normal model by comparing the event sequence with the normal model. Then, in a case where the event sequence matches with the normal model, the second detection unit 2060 determines that the terminal 10 is normal. On the other hand, in a case where the event sequence does not match with the normal model, the second detection unit 2060 determines that the terminal 10 is abnormal.

In addition to the above, for example, it is assumed that the reference information 30 indicates an abnormal model being a model representing an abnormal event sequence. In this case, the second detection unit 2060 determines whether an event sequence represented by a plurality of events acquired from the agent software 12 matches with an abnormal model by comparing the event sequence with the abnormal model. Then, in a case where the event sequence matches with the abnormal model, the second detection unit 2060 determines that the terminal 10 is abnormal. On the other hand, in a case where the event sequence does not match with the abnormal model, the second detection unit 2060 determines that the terminal 10 is normal.

Note that, an existing technique can be used as a specific technique for determining whether an event sequence matches with a predetermined model.

<Regarding Period when Predetermined Operation is not Performed>

The abnormality detection apparatus 2000 may perform abnormality detection of the terminal 10 also before and after a predetermined operation is started (specifically, a period when a predetermined operation is not performed). For example, the abnormality detection apparatus 2000 is configured in such a way as to constantly monitor an operation of the terminal 10. However, in this case, the abnormality detection apparatus 2000 detects abnormality of the terminal 10 at a reference different from a reference indicated by the reference information 30 during a period when a predetermined operation is not performed.

Figure 8:
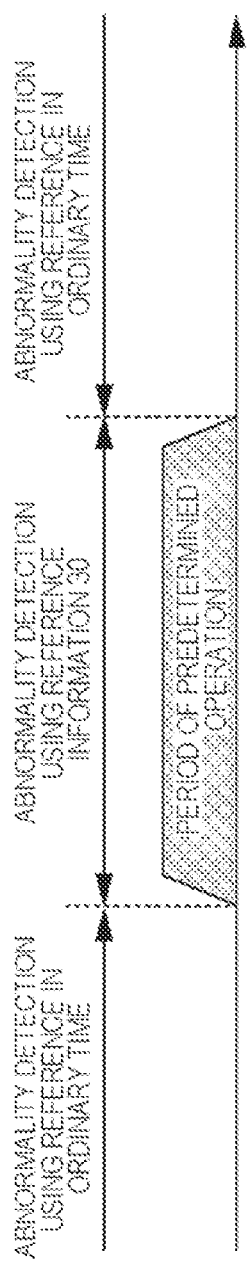
FIG. 8 is a diagram conceptually illustrating a scene in which abnormality detection using a different reference is performed during a period when a predetermined operation is performed, and during a period other than the above.

FIG. 8 is a diagram conceptually illustrating a scene in which abnormality detection using a different reference is performed during a period when a predetermined operation is performed, and a period other than the above. Before and after a period when a predetermined operation is performed, the abnormality detection apparatus 2000 detects abnormality of the terminal 10 by using reference information prepared for an ordinary time. On the other hand, during a period when a predetermined operation is performed, the abnormality detection apparatus 2000 detects abnormality of the terminal 10 by using the reference information 30 (reference information prepared for a period when a predetermined operation is performed).

For example, it is assumed that a predetermined operation is maintenance of the terminal 10. Generally, in maintenance, processing that is not performed in an ordinary time (e.g., execution of an application for maintenance) is performed. In view of the above, for example, whereas, in the reference information 30, an operation characteristic to a predetermined operation is permitted as a normal operation, such as execution of an application for use in maintenance, in second reference information 60, such an operation characteristic to a predetermined operation is inhibited as an abnormal operation. In this way, additionally permitting minimum required processing exclusively at a special timing when processing that is not used in an ordinary time is necessary, such as a maintenance time, enables increasing safety of the terminal 10 even at a special timing such as a maintenance time, while keeping safety of the terminal 10 high in an ordinary time.

Note that, as described above, in a case where a different reference is used in an ordinary time and in a time when a predetermined operation is performed, the reference information 30 may be configured as information indicating only a difference with respect to a reference in an ordinary time.

Example Embodiment 2

Figure 9:
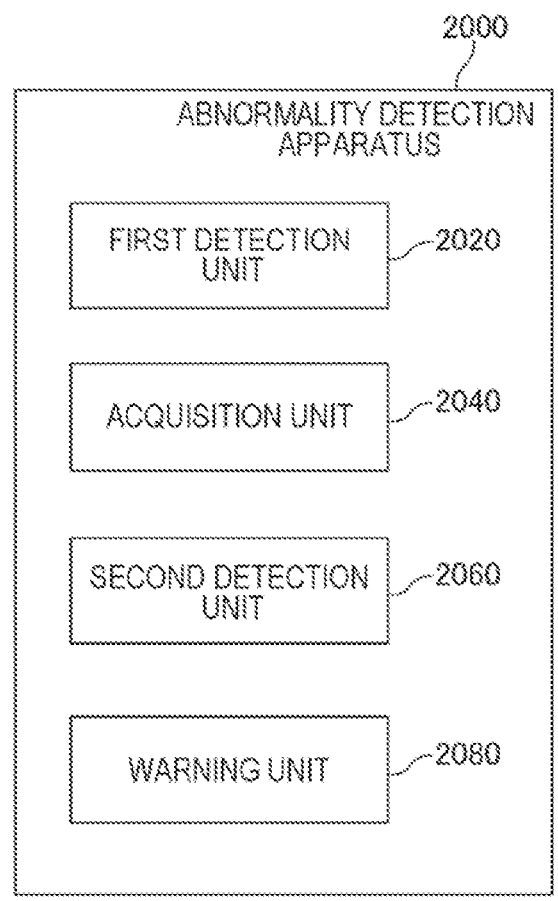
FIG. 9 is a block diagram illustrating a functional configuration of an abnormality detection apparatus according to an example embodiment 2.

FIG. 9 is a block diagram illustrating a functional configuration of an abnormality detection apparatus 2000 according to an example embodiment 2. The abnormality detection apparatus 2000 according to the example embodiment 2 has a function similar to that of the abnormality detection apparatus 2000 according to the example embodiment 1 except for a point described in the following.

The abnormality detection apparatus 2000 according to the example embodiment 2 further includes a warning unit 2080. When abnormality of a terminal 10 is detected by a second detection unit 2060, the warning unit 2080 outputs warning information representing a warning relating to the abnormality.

The warning information is at least information of a pattern enabling it to be recognized that abnormality of the terminal 10 is detected. In a case where it is only necessary to recognize that abnormality of the terminal 10 is detected, information of any format determined in advance can be used as the warning information. For example, it is possible to use text data including a predetermined message, audio data including a predetermined audio sound, and the like.

The warning information may include information enabling the recognition of a content of abnormality detected in the terminal 10. For example, it is assumed that, in the terminal 10, abnormality of the terminal 10 is detected due to occurrence of an event that should not originally occur. In this case, for example, the warning unit 2080 includes, in the warning information, information (such as a subject, an object, a content, and a time of occurrence) relating to the event.

In addition to the above, for example, it is assumed that abnormality of the terminal 10 is detected by non-matching of a sequence of events occurring in the terminal 10 with a normal model indicated by reference information 30. In this case, for example, the warning information includes information representing a sequence of events occurring in the terminal 10, and information representing a normal model indicated by the reference information 30. Specifically, information in which an event sequence and a normal model are graphed, and the like are included.

Figure 10:
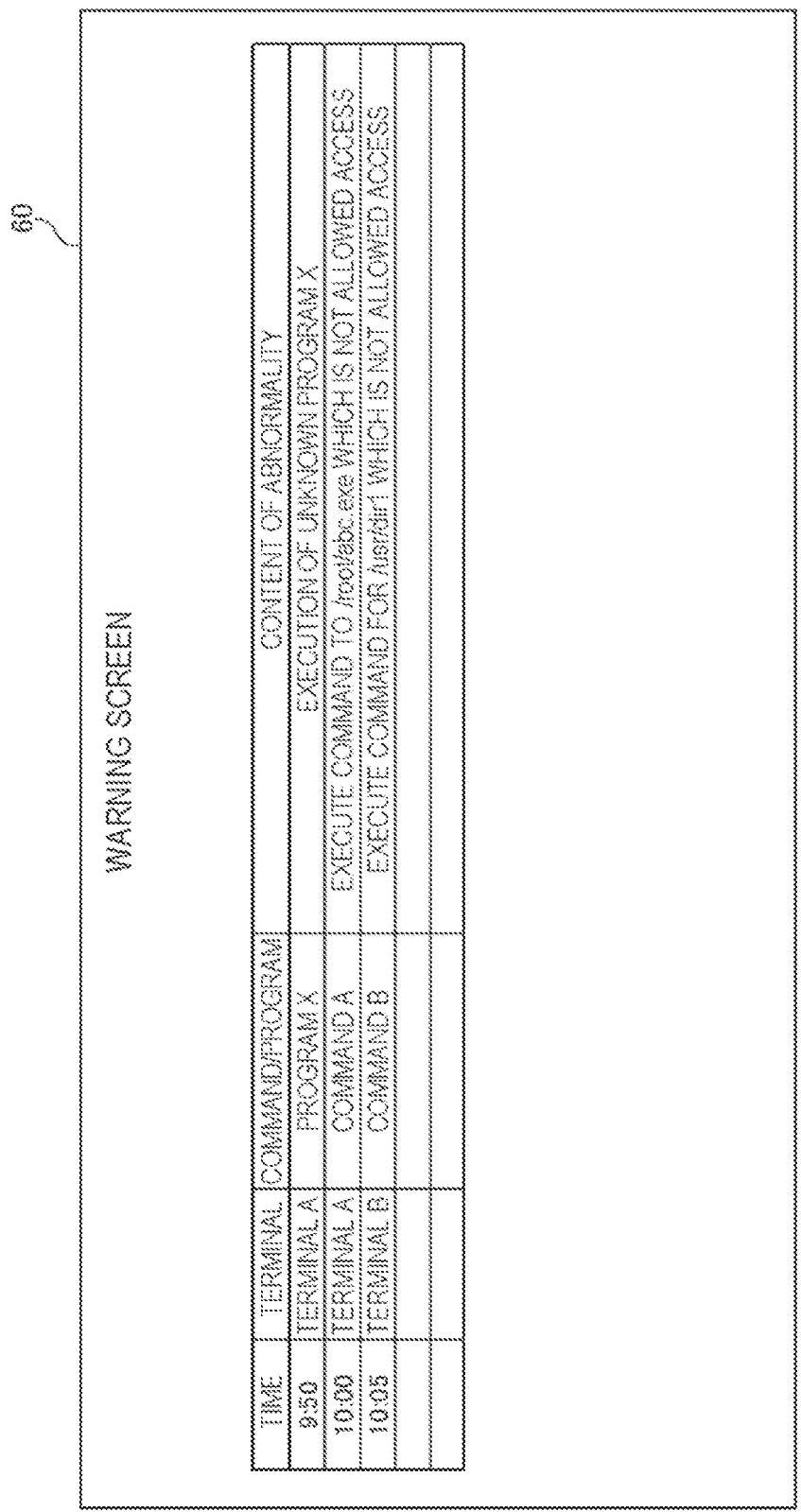
FIG. 10 is a diagram illustrating warning information.

FIG. 10 is a diagram illustrating the warning information. In FIG. 10, the warning information is achieved as a warning screen 60 to be displayed on a display apparatus. In this example, the abnormality detection apparatus 2000 performs abnormality detection with respect to a plurality of terminals 10 as a target. Then, regarding each detected abnormality, a time when the abnormality has occurred, identification information of the terminal 10 in which the abnormality is detected, identification information of a program or a command from which the abnormality has occurred, and a content of abnormality are displayed on the warning screen 60.

Herein, it is assumed that the abnormality detection apparatus 2000 is operated with respect to a plurality of terminals 10 as a target. In this case, the warning information may further include identification information of a terminal 10 in which abnormality is detected. However, in a case where an output destination of the warning information is the terminal 10 in which abnormality is detected, identification information of the terminal 10 may not be included in the warning information.

An output destination of the warning information is optional. For example, the warning information is output to any display apparatus accessible from the abnormality detection apparatus 2000. In addition to the above, for example, the warning information is stored in any storage apparatus accessible from the abnormality detection apparatus 2000. In addition to the above, for example, the warning information may be transmitted to another apparatus (e.g., the terminal 10 and the like) communicably connected to the abnormality detection apparatus 2000.

<Flow of Processing>

Figure 11:
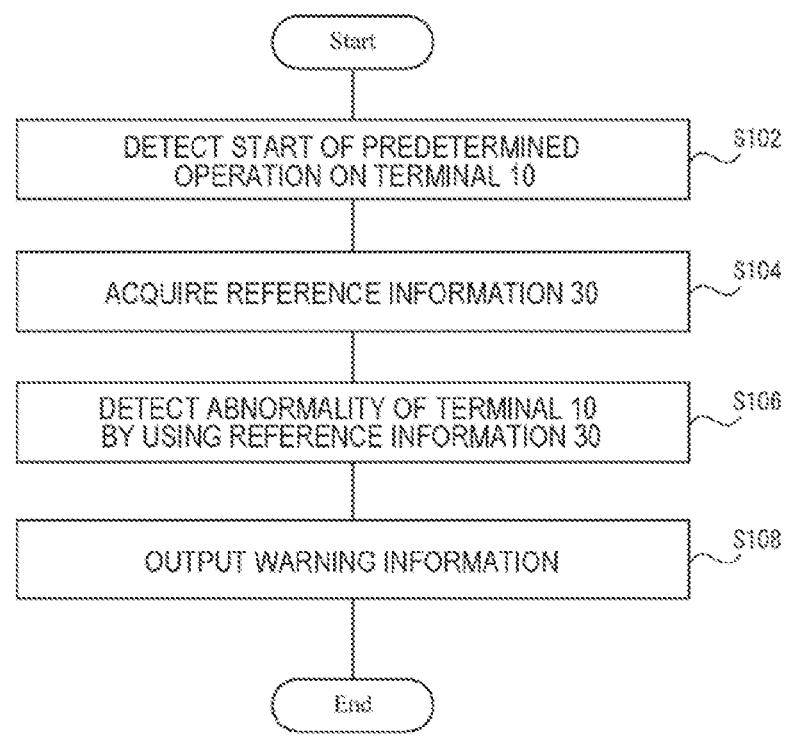
FIG. 11 is a flowchart illustrating a flow of processing to be performed by the abnormality detection apparatus according to the example embodiment 2.

FIG. 11 is a flowchart illustrating a flow of processing to be performed by the abnormality detection apparatus 2000 according to the example embodiment 2. Note that, S102 to S106 are similar to those in the flowchart of FIG. 4. After S106, the warning unit 2080 generates and outputs warning information (S108).

Example of Hardware Configuration

A hardware configuration of a computer for achieving the abnormality detection apparatus 2000 according to the example embodiment 2 is, for example, illustrated in FIG. 3 similarly to a hardware configuration of a computer for achieving the abnormality detection apparatus 2000 according to the example embodiment 1. However, a program module for achieving a function of each functional configuration unit included in the abnormality detection apparatus 2000 according to the example embodiment 2 is stored in a storage device 1080 included in a computer 1000 for achieving the abnormality detection apparatus 2000 according to the example embodiment 2.

Example Embodiment 3

Figure 12:
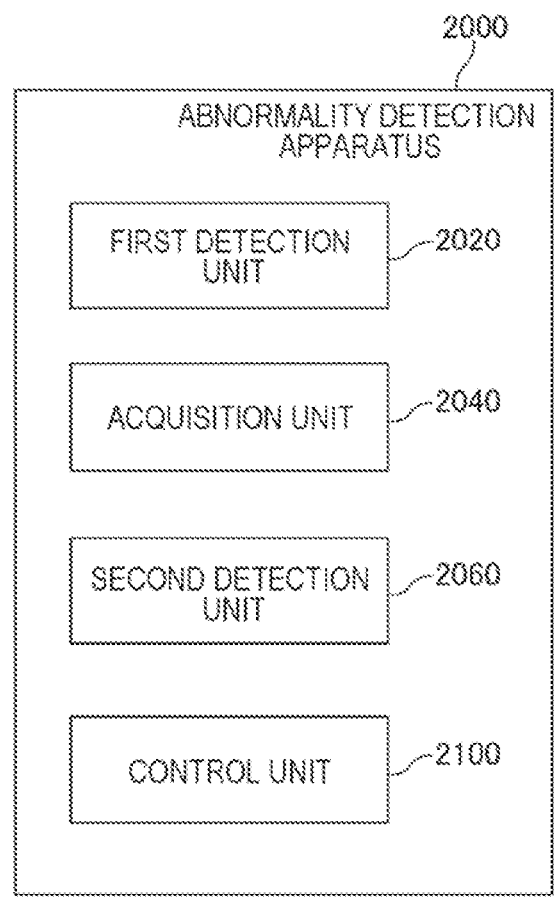
FIG. 12 is a block diagram illustrating a functional configuration of an abnormality detection apparatus according to an example embodiment 3.

FIG. 12 is a block diagram illustrating a functional configuration of an abnormality detection apparatus 2000 according to an example embodiment 3. The abnormality detection apparatus 2000 according to the example embodiment 3 has a function similar to that of the abnormality detection apparatus 2000 according to the example embodiment 1 or 2 except for a point described in the following.

The abnormality detection apparatus 2000 according to the example embodiment 3 further includes a control unit 2100. The control unit 2100 controls a terminal 10, when abnormality of the terminal 10 is detected by a second detection unit 2060.

For example, the control unit 2100 stops or ends an application that has performed an operation inhibited in reference information 30. However, an application to be stopped or ended by the control unit 2100 is not limited only to an application that has performed an abnormal operation. For example, the control unit 2100 may stop or end all applications that have been performed after a start of a predetermined operation, once abnormality of the terminal 10 is detected. In addition to the above, for example, the control unit 2100 may stop or end all applications associated with a predetermined operation, once abnormality of the terminal 10 is detected. For example, it is assumed that a predetermined operation started in the terminal 10 is an operation accompanying execution of a plurality of applications (e.g., execution of a script accompanying execution of a plurality of applications). In this case, for example, the control unit 2100 stops or ends all applications started by the predetermined operation.

Control to be performed by the control unit 2100 is not limited to stopping or ending an application. For example, when abnormality of the terminal 10 is detected, the control unit 2100 rolls back a state of the terminal 10 to a state before a predetermined operation is started. Note that, rolling back herein is not limited only to processing of completely returning a state of the terminal 10, but may be processing of returning a part of a state of the terminal 10 (e.g., processing of returning a content of each file updated after a start of a predetermined operation is detected into an original state (discarding updating)).

As a method of rolling back a state of a system, various methods can be used. For example, the control unit 2100 stores a state of the terminal 10 in a storage apparatus at a timing when a start of a predetermined operation is detected by a first detection unit 2020. For example, in a case where the terminal 10 is achieved by a virtual machine, a state of the terminal can be stored as a so-called snapshot. Then, when abnormality of the terminal 10 is detected by the second detection unit 2060, the control unit 2100 rolls back a state of the terminal 10 by using a state of the terminal 10 stored in the storage apparatus. Note that, it is possible to use an existing technique, as a specific technique for rolling back a state of a computer system by using a snapshot and the like.

In addition to the above, for example, the control unit 2100 performs, for a copy of a file, writing with respect to the file to be performed by the terminal 10 after a start of a predetermined operation is detected by the first detection unit 2020. In this case, in a case where a predetermined operation ends without detection of abnormality of the terminal 10, writing with respect to a copy file is reflected on an original file. On the other hand, when abnormality of the terminal 10 is detected before a predetermined operation is completed, the control unit 2100 does not reflect writing with respect to a copy file on an original file, and discards the copy file. Thus, in a case where abnormality of the terminal 10 is detected, it is possible to achieve rolling back, since updating of a file that has been performed after a start of a predetermined operation is discarded.

Herein, each operation to be performed by the terminal 10 may be interrupted until determination as to whether the operation is abnormal is ended by the abnormality detection apparatus 2000. For example, agent software 12 hooks an operation (e.g., a system call in which execution of an application, reading and writing of a file, or reading and writing with respect to a network is performed, and the like) of the terminal 10 being a target of abnormality detection by the abnormality detection apparatus 2000, and causes the second detection unit 2060 to operate in a state that execution of the system call is interrupted. Then, once execution of the system call is permitted by the second detection unit 2060, the interrupted operation of the terminal 10 is resumed. Since this enables detecting abnormality before an inhibited operation is started, it is possible to operate the terminal 10 more safely.

<Notification to User>

A content of control performed by the control unit 2100 may preferably be notified to a user of the terminal 10. For example, in a case where the control unit 2100 stops or ends an application, the control unit 2100 performs notification indicating that the application has stopped or ended. In addition to the above, for example, in a case where the control unit 2100 rolls back a state of the terminal 10, the control unit 2100 performs notification of the fact. For example, the notification can be output by a method similar to warning information.

<Flow of Processing>

FIG. 13 is a flowchart illustrating a flow of processing to be performed by the abnormality detection apparatus 2000 according to the example embodiment 3. Note that, S102 to S106 are similar to those in the flowchart in FIG. 4. After S106, the control unit 2100 controls an operation of the terminal 10 (S110).

Example of Hardware Configuration

A hardware configuration of a computer for achieving the abnormality detection apparatus 2000 according to the example embodiment 3 is, for example, illustrated in FIG. 3 similarly to a hardware configuration of a computer for achieving the abnormality detection apparatus 2000 according to the example embodiment 1. However, a program module for achieving a function of each functional configuration unit included in the abnormality detection apparatus 2000 according to the example embodiment 3 is stored in a storage device 1080 included in a computer 1000 for achieving the abnormality detection apparatus 2000 according to the example embodiment 3.

While the example embodiments of the present invention have been described with reference to the drawings, the example embodiments are only exemplification of the present invention, and a configuration in which the example embodiments are combined, and various configurations other than the above can also be employed.

A part or all of the above-described example embodiments may also be described as the following supplementary notes, but is not limited to the following.

1. An abnormality detection apparatus including:
    a first detection unit that detects a start of a predetermined operation in a terminal;
    an acquisition unit that acquires reference information representing a reference of abnormality detection of the terminal after the predetermined operation is started; and
    a second detection unit that detects, after it is detected that the predetermined operation is started, abnormality of the terminal by using the acquired reference information.

2. The abnormality detection apparatus according to supplementary note 1, wherein
    pieces of the reference information different from each other are respectively associated with two of the predetermined operations different from each other, and
    the acquisition unit acquires the reference information associated with the predetermined operation started in the terminal.

3. The abnormality detection apparatus according to supplementary note 1 or 2, further including,
    a warning unit that outputs warning information relating to the abnormality when abnormality of the terminal is detected by the second detection unit.

4. The abnormality detection apparatus according to any one of supplementary notes 1 to 3, further including
    a control unit that stops or terminates an application that has performed an abnormal operation on the terminal.

5. The abnormality detection apparatus according to any one of supplementary notes 1 to 3, further including,
    a control unit that rolls back a state of the terminal to a state before the predetermined operation is started when abnormality of the terminal is detected by the second detection unit.

6. The abnormality detection apparatus according to any one of supplementary notes 1 to 5, wherein,
    before a start of the predetermined operation is detected, the second detection unit detects abnormality of the terminal with a reference different from a reference indicated by the reference information.

7. The abnormality detection apparatus according to any one of supplementary notes 1 to 6, wherein
    the reference information indicates the sequence of a plurality of operations to be performed within the predetermined operation, and
    the second detection unit determines, when a sequence of operations detected in the terminal does not match with a sequence of operations indicated by the reference information, that the terminal is abnormal.

8. The abnormality detection apparatus according to supplementary notes 7, wherein
    an operation of the terminal indicated by the reference information is any one or more types among execution of an application, execution of a command, loading of a library, reading from a registry, writing into a registry, reading from a network, and writing into a network.

9. A control method to be performed by a computer including:
    a first detection step of detecting a start of a predetermined operation in a terminal;

an acquisition step of acquiring reference information representing a reference of abnormality detection of the terminal after the predetermined operation is started; and a second detection step of detecting, after it is detected that the predetermined operation is started, abnormality of the terminal by using the acquired reference information.

10. The control method according to supplementary note 9, wherein
   pieces of the reference information different from each other are respectively associated with two of the predetermined operations different from each other; and,
   in the acquisition step, the reference information associated with the predetermined operation started in the terminal is acquired.

11. The control method according to supplementary note 9 or 10, further including,
   a warning step of outputting warning information relating to the abnormality when abnormality of the terminal is detected in the second detection step.

12. The control method according to any one of supplementary notes 9 to 12, further including
   a control step of stopping or terminating an application that has performed an abnormal operation on the terminal.

13. The control method according to any one of supplementary notes 9 to 11, further including,
   a control step of rolling back a state of the terminal to a state before the predetermined operation is started when abnormality of the terminal is detected in the second detection step.

14. The control method according to any one of supplementary notes 9 to 13, wherein
   in the second detection step, before a start of the predetermined operation is detected, abnormality of the terminal is detected with a reference different from a reference indicated by the reference information.

15. The control method according to any one of supplementary notes 9 to 14, wherein
   the reference information indicates a sequence of a plurality of operations to be performed within the predetermined operation, and
   the control method further including,
   in the second detection step, when a sequence of operations detected in the terminal does not match with the sequence of operations indicated by the reference information, it is determined that the terminal is abnormal.

16. The control method according to supplementary notes 15, wherein
   an operation of the terminal indicated by the reference information is any one or more types among execution of an application, execution of a command, loading of a library, reading from a registry, writing into a registry, reading from a network, and writing into a network.

17. A program causing a computer to execute each step included in the control method according to any one of supplementary notes 9 to 16.

The invention claimed is:

1. An abnormality detection apparatus comprising:
   at least one memory configured to store instructions; and
   at least one processor configured to execute the instructions to:
      detect a start of a predetermined operation in a terminal;
      acquire reference information representing a reference of abnormality detection of the terminal after the start of the predetermined operation, the reference information indicates permission and prohibition regarding an operation of the terminal being at least one of execution of a command, execution of a system call, loading of a library, reading and writing with respect to a registry, and reading and writing with respect to a file and a network;
      detect, after having detected the start of the predetermined operation, abnormality of the terminal by using the acquired reference information, wherein
      the start of the predetermined operation in the terminal is detected by:
         comparing event information representing an event occurring in the terminal with trigger information defining a behavior of the terminal at the start of the predetermined operation; and
         determining that the predetermined operation is started in response to determining that the trigger information matches the event information;
      detect that while the application is executing in the terminal, the operation prohibited in the reference information is being performed; and
      stop or terminate an application being executed by the terminal in response to detecting that the operation prohibited in the reference information is being performed.

2. The abnormality detection apparatus according to claim 1, wherein
   pieces of the reference information different from each other are respectively associated with two of the predetermined operations different from each other, and
   the pieces of the reference information that are associated with the predetermined operation started in the terminal are acquired.

3. The abnormality detection apparatus according to claim 1, wherein
   the at least one processor is further configured to execute the instructions to:
      output warning information relating to the abnormality when the abnormality of the terminal is detected.

4. The abnormality detection apparatus according to claim 1, wherein
   the at least one processor is further configured to execute the instructions to:
      store a state of the terminal when the start of the predetermined operation is detected;
      roll back a state of the terminal to a state before the predetermined operation was started, by using the state of the terminal that has been stored, when the abnormality of the terminal is detected.

5. The abnormality detection apparatus according to claim 1, wherein
   a second reference used during a period when the predetermined operation is not performed is provided, the second reference being different from the reference indicated by the reference information, and
   the at least one processor is further configured to execute the instructions to:
      detect, during the period when the predetermined operation is not performed, the abnormality of the terminal with the second reference.

6. The abnormality detection apparatus according to claim 1, wherein
   the reference information indicates a sequence of a plurality of operations to be performed within the predetermined operation, and when a sequence of operations detected in the terminal does not match the sequence of operations indicated by the reference information, the abnormality of the terminal is detected.

7. The abnormality detection apparatus according to claim 1, wherein
the predetermined operation is a series of maintenance processing to be performed in the terminal.

8. The abnormality detection apparatus according to claim 1, wherein
the at least one processor is further configured to execute the instructions to:
perform writing with respect to a file after the start of the predetermined operation, wherein the writing is performed on a copy of the file and not on an original of the file;
when the predetermined operation ends without detection of the abnormality of the terminal, replace the original of the file with the copy of the file; and
when the abnormality of the terminal is detected before the predetermined operation is completed, do not replace the original of the file with the copy of the file.

9. A control method to be performed by a computer, comprising:
detecting, by a processor, a start of a predetermined operation in a terminal;
acquiring, by the processor, reference information representing a reference of abnormality detection of the terminal after the start of the predetermined operation, the reference information indicates permission and prohibition regarding an operation of the terminal being at least one of execution of a command, execution of a system call, loading of a library, reading and writing with respect to a registry, and reading and writing with respect to a file and a network;
detecting, by the processor and after having detected the start of the predetermined operation, abnormality of the terminal by using the acquired reference information, wherein
the start of the predetermined operation in the terminal is detected by:
comparing event information representing an event occurring in the terminal with trigger information defining a behavior of the terminal at the start of the predetermined operation;
determining that the predetermined operation is started in response to determining that the trigger information matches the event information;
detecting, by the processor, that while the application is executing in the terminal, the operation prohibited in the reference information is being performed; and
stopping or terminating, by the processor, an application being executed by the terminal in response to detecting that the operation prohibited in the reference information is being performed.

10. The control method according to claim 9, wherein
pieces of the reference information different from each other are respectively associated with two of the predetermined operations different from each other, and
the pieces of the reference information that are associated with the predetermined operation started in the terminal are acquired.

11. The control method according to claim 9, further comprising:
outputting warning information relating to the abnormality when the abnormality of the terminal is detected.

12. The control method according to claim 9, further comprising:
storing, by the processor, a state of the terminal when the start of the predetermined operation is detected; and
rolling back, by the processor, a state of the terminal to a state before the predetermined operation was performed, by using the state of the terminal that has been stored, when the abnormality of the terminal is detected.

13. The control method according to claim 9, wherein
a second reference used during a period when the predetermined operation is not performed is provided, the second reference being different from the reference indicated by the reference information, and
detecting, during the period when the predetermined operation is not performed, the abnormality of the terminal with the second reference.

14. The control method according to claim 9, wherein
the reference information indicates a sequence of a plurality of operations to be performed within the predetermined operation, and
when a sequence of operations detected in the terminal does not match with the sequence of operations indicated by the reference information, the abnormality of the terminal is detected.

15. A non-transitory computer-readable storage medium storing a program causing a computer to execute the control method according to claim 9.

* * * * *